United States Patent
Yun et al.

(10) Patent No.: US 7,076,726 B1
(45) Date of Patent: Jul. 11, 2006

(54) METHOD FOR MATCHING RATE IN MOBILE COMMUNICATION SYSTEM

(75) Inventors: Young Woo Yun, Seoul (KR); Sung Kwon Hong, Kyonggi-do (KR); Sung Lark Kwon, Seoul (KR); Young Jo Lee, Seoul (KR)

(73) Assignee: LG Information & Communication, Ltd., Seoul (KR)

( * ) Notice: Subject to any disclaimer, the term of this patent is extended or adjusted under 35 U.S.C. 154(b) by 801 days.

(21) Appl. No.: 09/644,100

(22) Filed: Aug. 23, 2000

(30) Foreign Application Priority Data

Aug. 24, 1999 (KR) ............................... 1999-35227
Sep. 21, 1999 (KR) ............................... 1999-40809

(51) Int. Cl.
*H03M 13/03* (2006.01)
(52) U.S. Cl. .................................................... 714/790
(58) Field of Classification Search ................ 714/790, 714/781, 786, 704, 708, 755; 370/315, 316, 370/320, 335, 341, 342; 375/200, 206, 211, 375/347, 140, 265; 455/13.4
See application file for complete search history.

(56) References Cited

U.S. PATENT DOCUMENTS

| | | | | |
|---|---|---|---|---|
| 5,710,792 A | * | 1/1998 | Fukawa et al. | 375/229 |
| 5,970,085 A | * | 10/1999 | Yi | 370/342 |
| 6,222,828 B1 | * | 4/2001 | Ohlson et al. | 370/320 |
| 6,397,367 B1 | * | 5/2002 | Park et al. | 714/786 |
| 6,622,277 B1 | * | 9/2003 | Ramanujam et al. | 714/755 |
| 6,671,851 B1 | * | 12/2003 | Moulsley | 714/790 |

OTHER PUBLICATIONS

Matsuoka, Hiderhio, et al., "Adaptive Modulation System wtih Punctured Convolutional Code of High Quality Personal Communication Systems," IEEE, pp. 22-26, Apr. 1995.

Joachim Hagenauer, "Rate-Compatible Punctured Convolutional Codes (RCPC Codes) and their Applications" IEEE Transactions on Communications, vol. 36. No. 4, Apr. 1988 pp. 389-400.

Herausgegeben von Claus Wilhelm, "Daten-übertragung" Militärverlag der Deutschen Demokratischen Republik.

DE Office Action dated Jan. 25, 2005.

* cited by examiner

*Primary Examiner*—Guy J. Lamarre
(74) *Attorney, Agent, or Firm*—Lee, Hong, Degerman, Kang & Schmadeka, P.C.

(57) ABSTRACT

A method for matching a rate in a mobile communication system causes puncturing or repetition in a fixed pattern, in which puncturing or repetition is applied to each bitstream on transport channels supporting different services in a next generation mobile communication system of the W-CDMA (Wideband Code Division Multiple Access) system. The method comprises the steps of (1) subjecting a bitstream on a transport channel for use in supporting a particular service to channel coding, (2) determining an initial error offset value for use in avoiding all the puncturing only in a particular bitstream among one or more than one bitstreams produced by the channel coding, (3) periodically subtracting a decrement from the determined initial error offset value, for puncturing a bit at a relevant position when a result of the subtraction satisfies a puncturing condition, (4) adding an update error parameter determined as the maximum bit size among TF (Transport Format) transportable during one TTI (Transport Time Interval) of the transport channel after the puncturing to a result of the subtraction, for updating an initial error offset value, and (5) periodically subtracting a decrement from the updated initial error offset value, for determining a position of a relevant bit to be punctured at the next time.

40 Claims, 3 Drawing Sheets

FIG.2
BACKGROUND ART

| 1 | 2 | 3 | 4 | 5 | 6 | 7 | 8 | 9 | 10 | 11 | 12 | 13 | 14 | 15 | 16 | 17 | 18 | 19 | 20 |

FIG.3
BACKGROUND ART

| 1 | 2 | 3 | 4 | 5 |

FIG.4
BACKGROUND ART

| 1 | 2 | 3 | 4 | 5 | 6 | 7 | 8 | 9 | 10 | 11 | 12 |
|---|---|---|---|---|---|---|---|---|---|---|---|
| (557) | (663) | (771) | (557) | (663) | (771) | (557) | (663) | (771) | (557) | (663) | (771) |

FIG.5

| 1 | 2 | 3 | 4 | 5 | 6 | 7 | 8 | 9 | 10 | 11 | 12 |
|---|---|---|---|---|---|---|---|---|---|---|---|
| (557) | (663) | (771) | (557) | (663) | (771) | (557) | (663) | (771) | (557) | (663) | (771) |

FIG.6

| 1 | 2 | 3 | 4 | 5 | 6 | 7 | 8 | 9 | 10 | 11 | 12 | 13 | 14 | 15 | 16 | 17 | 18 | 19 | 20 |

FIG.7

| 1 | 2 | 3 | 4 | 5 |

FIG.8

| 1 | 2 | 3 | 4 | 5 | 6 | 7 | 8 | 9 | 10 | 11 | 12 | 13 | 14 | 15 | 16 | 17 | 18 | 19 | 20 |

FIG.9

| 1 | 2 | 3 | 4 | 5 |

METHOD FOR MATCHING RATE IN MOBILE COMMUNICATION SYSTEM

BACKGROUND OF THE INVENTION

1. Field of the Invention

The present invention relates to a mobile communication system, and more particularly, to a method for matching a rate, in which puncturing or repetition is applied to each bitstream on transport channels supporting different services in a next generation mobile communication system of the W-CDMA (Wideband Code Division Multiple Access) system.

2. Background of the Related Art

Recently, the ARIB of Japan, the ETSI of the Europe, the TIA of the USA, the TTA of Korea, and the TTC of Japan have suggested next generation mobile communication systems based on the core network technology and the radio access technology in the existing GSM (Global System for Mobile communication) which serves for multimedia, such as audio, video and data. In order to provide a technical specification for the next generation mobile communication system, the organizations agreed on a common research, project called as 3GPP (Third Generation Partnership Project).

The 3GPP has different technical specification groups, wherein the RAN (Radio Access Network) specification group suggests technical specifications on uplink rate matching and downlink rate matching. The rate matching is a method for adjusting a bitstream passed through a channel coding to a level of code rate which is most suitable for a radio interface by subjecting to puncturing process for removing a particular bit, or to repetition process for adding a particular bit. A puncturing algorithm and repetition algorithm is used in the rate matching, which is implemented differently to uplink and downlink, because a rate matched bitstream is interleaved in the downlink, and an interleaved bitstream is rate matched in the uplink.

There are two types of downlink rate matchings, i.e., a fixed position rate matching for puncturing and repetition carried out at a fixed position transport channel, which is detected in decoding at a reception side when a reception bit rate is fixed by using a blind rate detection, and a flexible position rate matching with positions of the puncturing and the repetition are flexible, which is used in decoding at the reception side when a reception bit rate is detected by using TFCI (Transport Format Combination Indicator) field information among various field of reception frames. Respective downlink rate matching has a puncturing patterning (or repetition pattern) determining procedure using the puncturing algorithm and a signaling determining procedure to be used in the puncturing algorithm (or the repetition algorithm) to calculate the amount of rate matching.

In the signaling determining procedure, a number of bits to be punctured (or repeated), and an initial error offset value $e_{ini}$ of a parameter "e" for use in determining the puncturing pattern (or repetition pattern) are calculated. In the rate matching pattern determination procedure, '$e_{ini}$' value determines the initial position for puncturing (or repetition) and with respect to this initial position, remaining position to be punctured (or repeated) are determined to have uniform intervals. It is a basic precondition of a current downlink rate matching that a result of the signaling determining procedure is applied to the rate matching algorithm, for allowing a uniform puncturing (or a uniform repetition) for entire channel coded bitstream.

Current uniform rate matching pattern determination algorithm can be expressed as follows, where N denotes a size of channel coded input bitstream, and $N_i$ denotes a size of output bitstream after the rate matching.

```
input bitstream S_0 = {d_1, d_2, d_3, - - - , d_N}
"if puncturing is to be performed
y = N - N_i          ; a number of bits to be punctured (-ΔN)
e = e_ini            ; initial error between current and desired puncturing
                       ratio.
m = 1                ; index of current bit
do while m ≤ N
    e = e - a*y      ; update error
    if e ≤ 0 then    ; check if bit number m should be punctured
        puncture bit m from set S_0
    e = e + a*N      ; update error
    end if
    m = m + 1        ; index of next bit
end do
else
y = N_i - N          ; a number of bits to be repeated (ΔN)
e = e_ini            ; initial error between current and desired repeating
                       ratio.
m = 1                ; index of current bit
do while m ≤ N
    e = e - a*y      ; update error
    do while e ≤ 0   ; check if bit number m should be repeated
        repeat bit m from set S_0
    e = e + a*N      ; update error
    end do
    m = m + 1        ; index of next bit
end do
end if"
```

In order to obtain a uniform puncturing pattern (or a uniform repetition pattern) of the channel coded input bitstream by carrying out the foregoing rate matching algorithm, an initial error offset value $e_{ini}$ of a parameter for determining the puncturing pattern (or repetition pattern) in the signaling procedure should be determined, appropriately.

FIG. 1 illustrates a block diagram showing a hardware system for matching a rate in downlink according to 3GPP RAN (Radio Access Network) standard for 1/3 rate channel codes. As shown in FIG. 1-($a$) and FIG. 1-($b$), rate matching for convolutional codes and that for turbo codes have somewhat different structure. When the channel encoder 1 carries out the convolutional coding in FIG. 1-($a$), the output bit stream X, Y, Z from the channel encoder 1 have almost identical importance. Therefore, bit separation block 2 doesn't do anything and pass the entire coded bit stream to the rate matching block 3. The rate matching block 3 performs rate matching pattern determination algorithm over the entire coded bit stream using the parameter such as N, $e_{ini}$, and a. This procedure is based on the assumption that the each code bit in one code symbol has approximately the same importance. However, even in an actual convolutional codes, the influences form respective output bit streams to hamming weight distribution of the bit streams before coding are different. After rate matching block 3, bit collection block 4 operates and it output the punctured or repeated bit streams in appropriate order. When the channel encoder 1 carries out turbo coding in FIG. 1-($b$), the output bit streams form the channel encoder 1 branch off into a systematic bit stream X of the highest importance, and a first bit stream Y and a second bit stream Z, both of identical importance. This operation is performed in the bit separation block 2. There after, respective rate matching block RMB3, 4 subject respective bit streams Y and Z to puncturing based on N, eini, and a form the rate matching signaling.

In the meantime, a constant or fixed parameter "a=2" is used in determining a position of code bit to be punctured (or repeated) in the rate matching for current convolution code, and the initial error offset value $e_{ini}$ of the parameter 'e' determining the puncturing pattern (or repetition pattern) is determined according to the following equations (1) and (2).

First, in the flexible position rate matching, the initial error offset value $e_{ini}$ is determined based on the following equation (1).

$$e_{ini} = N_{il}^{TTI} \quad (1)$$

On the other hand, in the fixed position rate matching, the initial error offset value $e_{ini}$ is determined based on following equation (2).

$$e_{ini} = \max_{l \in TFS(i)} N_{i,l}^{TTI} \quad (2)$$

In equations (1) and (2), the subscript i denotes an index representing a transport channel number, the subscript l denotes an index representing TF (Transport Format) available in one TTI (Transport Time Interval) in a TFS (Transport Format Set). In other word, in the case of fixed position rate matching, a maximum bit size among bits in the TFS representing TFs transportable during each TTI which denotes a bit transport period in each transport channel is determined as the $e_{ini}$.

Referring to FIG. 2, as one example of the fixed position rate matching, if it is assumed that the TFS in one TTI has 5 bits, 10 bits, 15 bits, and 20 bits, the $e_{ini}$=20 when a TTI bit size is 20. In this instance, since a size N of input bitstream for the rate matching is the TTI bit size, N=20. The procedure for application of the foregoing parameter values to current rate matching algorithm and puncturing four bits of the input bitstream (ΔN=−4) is as follows.

With regard to puncturing of a first bit (when m=1) among total 20 bits, since y=4, $e_{ini}$=20, and the update error value calculated according to "e=e−2*y" is 12, that does not satisfy the condition of "e≦0", no puncturing occurs for the first bit. With regard to puncturing of a second bit (when m=2), since the update error value calculated according to "e=e−2*y" from e=12 updated in the prior step is 4, such a result does not satisfy the condition of "e≦0", and no puncturing occurs for the second bit.

Next, with regard to puncturing of a third bit (when m=3), since the update error value calculated according to "e=e−2*y" from e=4 updated in the prior step is −4, that satisfies the condition of "e≦0", a first puncturing occurs at the third bit. After the puncturing of the third bit, the error value is updated as e=36 according to "e=e+2*N", and a loop is repeated for determining a next bit position to be punctured. A puncturing pattern (shaded bit positions) according to procedure is shown in FIG. 2.

The next example is when the TTI bit size is changed to 5. Although the input bitstream size N has changed to N=5 for the rate matching, the initial error offset value $e_{ini}$ is determined to be $e_{ini}$=20 according to equation (2) regardless of the TTI change. The procedure for application of the foregoing parameter values to current rate matching algorithm and puncturing four bits of the input bitstream (ΔN=−4) is as follows.

With regard to puncturing of a first bit (when m=1) among total 5 bits, since y=4, $e_{ini}$=20, and the update error value calculated according to "e=e−2*y" is 12, that can not satisfy the condition of "e≦0", no puncturing occurs for the first bit.

With regard to puncturing of a second bit (when m=2), since y=4, and the update error value calculated according to "e=e−2*y" from e=12 updated in the prior step is 4, which does not satisfy the condition of "e≦0", no puncturing occurs for the second bit.

With regard to puncturing of a third bit (when m=3), since y=4, and the update error value calculated according to "e=e−2*y" from e=4 updated in the prior step is −4, which satisfies the condition of "e≦0", a first puncturing occurs at the third bit. After the puncturing of the third bit, the error value is updated as e=6 according to "e=e+2*N", and a loop is continued for determining a bit position to be punctured at the next bit. In this specific instance, the puncturing occurs at the fourth bit, and the puncturing occurs at the fifth bit, as shown in the shaded bit position of FIG. 3.

In the current rate matching algorithm based on parameters $e_{ini}$ and 'a', the relevant bits are punctured (or repeated) when a result of a subtraction e=e−2*y satisfies a particular condition of e≦0, an error offset value is updated. Based on current procedure, there have been cases, as shown in FIG. 3, a problem occurs when the updated error offset value is changed after the puncturing and when the TTI bit size is changed.

Such a problem causes puncturing (or repetition) concentrated on a portion of bits, failing to satisfying a uniform puncturing (or a uniform repetition) for the entire channel coded bitstreams X, Y, Z resulting in a deterioration of an overall code performance. If the initial error offset value in the aforementioned current rate matching algorithm is used when the channel encoder carries out 1/3 rate convolutional coding separately, there can be a worst case when the puncturing is occurred only in a particular bitstream (especially, Z bitstream) among the three bitstreams branched off from the convolutional coded output bitstream, resulting in a code performance deterioration.

As described above, even if an actual convolutional code is used, influences from respective output bitstreams to hamming weights for the bitstreams before coding are different. For example, if a length of input bitstream is fixed for a rate matching of 12, two bits are to be punctured in the input bitstream in the signaling determining procedure. With regard to puncturing of a first bit (when m=1) among total 12 bits, since y=2, $e_{ini}$=12, and the update error value calculated according to "e=e−2*y" is 8, which does not satisfy the condition of "e≦0", no puncturing occurs at the first bit. With regard to puncturing of a second bit (when m=2), since y=2, and the update error value calculated according to "e=e−2*y" from e=8 updated in the prior step is 4, which does not satisfy the condition of "e≦0", no puncturing occurs for the second bit. With regard to puncturing of a third bit (when m=3), since y=2, and the update error value calculated according to "e=e−2*y" from e=4 updated in the prior step is 0, which satisfies the condition of "e≦0", a first puncturing occurs at the third bit.

Upon carrying out the foregoing procedure repeatedly for the entire input bitstream, a puncturing pattern as shown in FIG. 4 is obtained. As FIG. 4, the puncturing for the 1/3 rate convolutional coding is occurred only at a third code bit among the three code bits in one symbol of the convolutional code. Such a situation can not be avoided in a case when a puncturing interval is a multiple of six.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

An object of the present invention is to provide a method for matching a rate in a mobile communication system, in which an initial error offset value used when a rate matching is carried out for a channel coded bitstream is fixed to a constant smaller than an input bitstream size, for elimination of the worst puncturing pattern for the 1/3 rate convolution code used in the W-CDMA system.

Other object of the present invention is to provide a method for matching a rate in a mobile communication system, in which a separate parameter that represent an updated error value is employed further when the puncturing (or repetition) is carried out while keep subtracting a decrement from a preset initial error offset value $e_{ini}$ in the case of the fixed rate matching, for causing the puncture (or the repetition) occurred at fixed bit positions with uniform distance regardless of TTI bit size change.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for matching a rate in a mobile communication system for causing puncturing or repetition in a fixed pattern includes the steps of (1) subjecting a bitstream on a transport channel for use in supporting a particular service to channel coding, (2) determining an initial error offset value for use in avoiding all the puncturing only in a particular bitstream among one or more than one bitstreams produced by the channel coding, (3) periodically subtracting a decrement from the determined initial error offset value, for puncturing a bit at a relevant position when a result of the subtraction satisfies a puncturing condition, (4) adding an update error parameter determined as the maximum bit size among TF (Transport Format) transportable during one TTI of the transport channel after the puncturing to a result of the subtraction, for updating an initial error offset value, and (5) periodically subtracting a decrement from the updated initial error offset value, for determining a position of a relevant bit to be punctured at the next time.

The initial error offset value is determined to be any one of constants equal to, or below an integer time of the maximum bit size among TFs transportable during one TTI of the transport channel. Particularly, the initial error offset value is determined to be '1' fixedly or as the maximum bit size among the TFs transportable during the TTI of the transport channel.

The present invention can also be achieved in whole or in parts by a method for matching a rate in a mobile communication system based on puncturing or repetition, the method comprising the steps of (1) determining an initial error offset value for a plurality of bitstreams of different bit sizes to be punctured or repeated, (2) periodically updating the initial error offset value and performing one of puncturing and repetition when the updated initial error offset value is no greater than a prescribed value, (3) after puncturing or repetition, updating the updated initial error value based on a maximum bit size of said plurality of bitstreams, and (4) if applicable, repeating steps (2) and (3) for remaining bits of the bitstreams.

The present invention can also be achieved in whole or in parts by a method for matching a rate in a mobile communication system, for causing puncturing or repetition in a fixed pattern, the method comprising the steps of (1) determining a constant smaller than channel coded bitstream sizes as an initial error offset value, (2) updating the initial error offset value and performing one of puncturing and repetition when the offset value is equal to or below a prescribed value, and (3) if applicable, repeating step (2) such that the output bitstream produced by the channel coding has one of punctured and repeated bits at fixed intervals.

The present invention can also be achieved in whole or in parts by a method for matching rates in a mobile communication system, the method comprising the steps of subjecting a bitstream on a transport channel for use in a particular service to a prescribed coding, periodically subtracting a decrement from an initial error offset value determined to be no greater than a maximum bit size transportable during one transport time interval (TTI) of the transport channel, subjecting a relevant bit in the bitstreams produced by the prescribed coding to one of puncturing and repetition when a result of the subtraction becomes zero or below zero, and adding an update error parameter determined as the maximum bit size among transport format (TF) transportable during one TTI of the transport channel after the puncturing to a result of the subtraction which is zero or below zero for updating the initial error offset value.

The present invention can also be achieved in whole or in parts by a device for matching a rate in a mobile communication system comprising a channel encoder for subjecting a bitstream on a transport channel for use in supporting a particular service to channel coding, and at least one rate matching block for adjusting a transport code rate by using an initial error offset value and an update error parameter such that one of puncturing and repetition of only a particular bitstream from the channel encoder is avoided.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 2 illustrates one example of a related art puncturing pattern when a TTI bit size is 20;

FIG. 3 illustrates one example of a related art puncturing pattern when a TTI bit size is 5;

FIG. 4 illustrates one example of a puncturing pattern for which a related art initial error offset value is used in a case when two bit puncturings are occurred for 12 bits of input bitstream in a RMB (rate matching block);

FIG. 5 illustrates one example of a puncturing pattern for which an initial error offset value in accordance with a preferred embodiment of the present invention is used in a case when two bit puncturing are occurred for 12 bits of input bitstream in a RMB;

FIG. 6 illustrates a puncturing pattern when a TTI bit size is 20 in accordance with a preferred embodiment of the present invention;

FIG. 7 illustrates a puncturing pattern when a TTI bit size is 5 in accordance with a preferred embodiment of the present invention;

FIG. 8 illustrates a puncturing pattern when a TTI bit size is 20 in accordance with another preferred embodiment of the present invention; and FIG. 9 illustrates a puncturing pattern when a TTI bit size is 5 in accordance with another preferred embodiment of the present invention.

DETAILED DESCRIPTION OF PREFERRED EMBODIMENTS

Figure 1A:
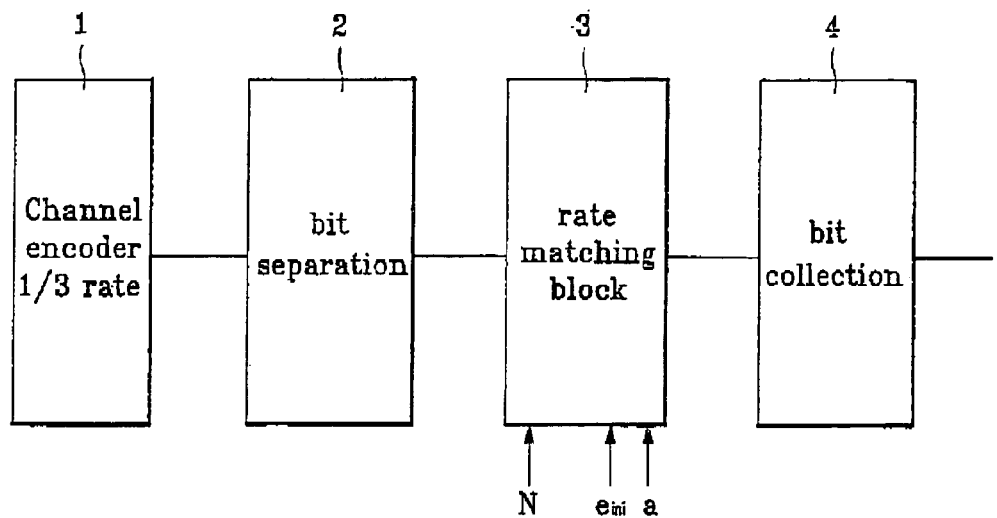
FIGS. 1a and 1b illustrate a block diagram showing a hardware system for matching a rate in a downlink according to 3GPP RAN standard.
Figure 1B:
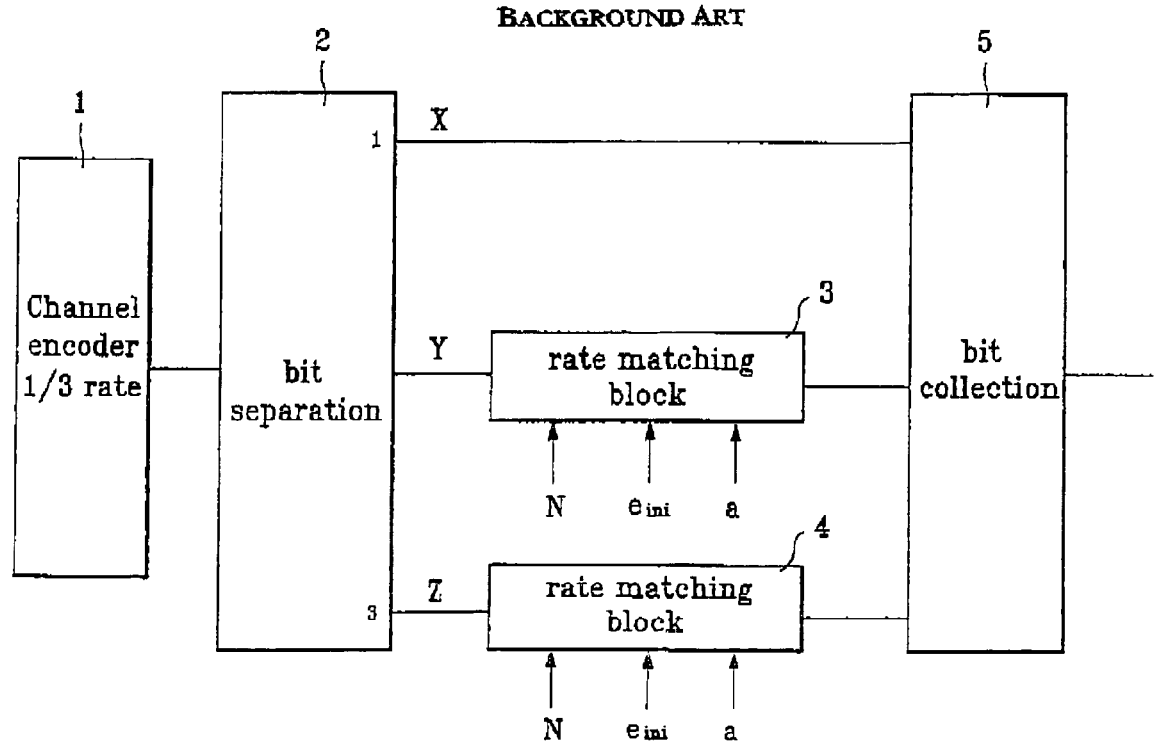

The 1/3 rate convolutional code used in the 3GPP standard is obtained by using polynomials of "$557_8=101101111_2$", "$663_8=110110011_2$", and "$711_8=111001001_2$" at a channel encoder, where subscript "8" indicates an octal format and subscript "2" indicates a binary format. An output bitstream obtained by polynomial "$557_8=101101111_2$" is 'X', an output bitstream obtained by polynomial "$663_8=110110011_2$" is 'Y', and an output bitstream obtained by polynomial "$711_8=111001001_2$" is 'Z'. When the channel encoder carries out a turbo coding, the systematic bit stream 'X' has a higher importance in comparison to the first parity bit stream 'Y' and the second parity bitstream 'Z'. A rate matching algorithm for the convolution code makes a uniform puncturing (or uniform repetition) for a channel coded entire bitstream, which implies that all the output bitstreams have identical importance when the convolutional coding is carried out.

However, even if the channel encoder carries out a convolutional coding, influences from respective output bitstreams to hamming weights for the bitstreams before the coding are different. In conclusion, it is necessary to avoid the case when all the puncturing or repetition is imposed on a particular bitstream of a higher importance in the convolution coded output bitstreams, for enhancing the performance. Presently, it is preferable that the case when all the puncturing for the output bitstream 'Z' obtained from the polynomial "$711_8=111001001_2$" among the three convolutional coded output bitstreams be avoided.

As described above, there are situations when all the puncturing is occurred only in the output bitstream 'Z' obtained from the polynomial "$711_8=111001001_2$" if the existing initial error offset value $e_{ini}$ is used, as shown in FIG. 4. If the input bit size and the puncturing amount in a rate matching procedure are determined such that the puncturing interval is to be a multiple of six, all the puncturing occurs only in the 'Z' bitstream.

The present invention uses a fixed initial error offset value $e_{ini}$ of a parameter 'e' for determining a puncturing pattern (or a repetition pattern). In other words, instead of using an initial offset value $e_{ini}$ according to equations (1) and (2), a constant value smaller than the input bitstream size is used. Specifically, the present invention sets a fixed initial error offset value. Both in the downlink fixed position rate matching or in the uplink flexible position rate matching, the value of '1' is used as the initial error offset value $e_{ini}$. If the initial error offset value $e_{ini}$ is set to be '1', the worst puncturing pattern that imposes all the puncturing on the output bit stream "Z" can be naturally turned into the pattern that imposes all the puncturing on the output bit stream "X". That is, the worst case can be easily avoided by using the initial offset value as '1'.

FIG. 5 illustrates an example of a puncturing pattern when an initial error offset value of "1" is used in accordance with a preferred embodiment of the present invention when two bit puncturing occurs for 12 bits of input bitstream in a RMB. With regard to puncturing of a first bit (when m=1) among total 12 bits, since y=2, $e_{ini}$=1, and the update error value calculated according to "e=e−2*y" is −3, which satisfies the condition of "e≦0", puncturing occurs at the first bit. After the puncturing, the error offset value is updated to 21 according to "e=e+2*N", which is applied to a second bit. With regard to puncturing of the second bit (when m=2), since y=2, and the update error value calculated according to "e=e−2*y" from e=21 updated in the prior step is 17, which does satisfy the condition of "e≦0", no puncturing occurs at the second bit. With regard to puncturing of a third bit (when m=3), since y=2 and the update error value calculated according to "e=e−2*y" from e=17 updated in the prior step is 13, which does not satisfy the condition of "e≦0", no puncturing occurs at the third bit. Upon repetition of the foregoing procedure for the entire 12 bits, a puncturing pattern of FIG. 5 is obtained. The two bit puncturing occurs only at a first code bit among three code bits which forms one symbol in a 1/3 rate convolution code.

Accordingly, by setting the initial error offset value $e_{ini}$ to '1' in the current rate matching algorithm, a puncturing pattern of a better performance can be obtained, which occurs from the output bitstream 'X' from the polynomial "$557_8=101101111_2$" and the worst case puncturing pattern of FIG. 4 can be avoided and naturally changed into the better pattern The present invention is applicable, not only to a downlink, but also to an uplink. Presently, an initial error offset value expressed as the following equation (3) is used in the uplink rate matching algorithm of the 3GPP standard.

$$e_{ini}=[(a*S(k))*|\Delta N|+N] \bmod a*N \qquad (3)$$

However, if the above initial error offset value is applied to an existing rate matching algorithm, the worst situation may be occurred, as shown below as an example.

First, a case when the initial error offset value is calculated to be '0' can be occurred, which is possible when N is an even number in equation (3). If $e_{ini}$=0 calculated in the signaling determining procedure to the uplink rate matching algorithm, either a desired amount of puncturing or a puncturing pattern with fixed intervals can not be obtained. Therefore, in addition to the initial error offset value by using equation (3), a 'zero test' procedure is also required. In other, in the related art uplink, after the initial error offset value $e_{ini}$ is calculated according to equation (3), a 'zero test' is carried out according to the following equation (4) if the initial error offset value is determined to be '0'.

$$\text{if } (e_{ini}=0) \; e_{ini}=a*N \qquad (4)$$

Second, similar to the downlink, if the initial error offset value calculated according to the equation (3) is used in the case of the uplink, the worst case is unavoidable, where all the puncturing occurs in the 'Z' bitstream.

In comparison to the above cases, the preferred embodiment of the present invention can avoid the worst puncturing patten where the puncturing occurs only in the 'Z' bitstream, and avoids the additional operation of performing the 'zero test'. If the initial error offset value of the present invention is applied to a uplink rate matching for the convolution code, the initial error offset value $e_{ini}$ can be expressed as equation (5), below.

$$e_{ini} = [(a*S(k))*|\Delta N|+1] \mod a*N \quad (5)$$

Next, the initial error offset value in accordance with the preferred embodiment of the present invention is introduced to a downlink fixed position rate matching as follows.

In a general rate matching, an initial error offset value $e_{ini}$ is subtracted until "e≦0" condition is satisfied such that the puncturing (or repeating) is performed. After the puncturing (or repetition), a previous error value set is updated. The present invention can further employ an update parameter Nup representing an update error value for a fixed position rate matching pattern additionally, where a max operation, as shown in equation (6) is used in calculation of the update parameter Nup.

$$Nup = \max_{l \in TFS(i)} N_{i,l}^{TTI} \quad (6)$$

where the subscript 'i' denotes an index representing a transport channel number, and the subscript 'l' denotes an index representing a transport format one TTI may have in a TFS.

The various parameters used in the rate matching of the present invention can be summarized as follows.

N: an input bitstream size for a rate matching.

P: Puncturing rate or repetition rate.

ΔN: Total number of bits punctured (or repeated) at all RMB. (i.e., P*N).

$N_i$: an output bitstream size after the rate matching (i.e., $=N_i+\Delta N$).

$e_{ini}$: an initial error offset value for calculating an initial puncturing bit position (or an initial repeating bit position).

Nup: an update parameter representing an update error value.

The foregoing parameters differ when the channel encoder carries out a convolutional coding from the case when the channel encoder carries out a turbo coding. The parameters used in the rate matching of the present invention is determined as follows when a convolutional coding is carried out.

$$\Delta N = \Delta N_{i,*}^{TTI} \quad (7)$$

$$N = N_{i,l}^{TTI} \quad (8)$$

$$Nup = \max_{l \in TFS(i)} N_{i,l}^{TTI} \quad (9) = (6)$$

$$e_{ini} = 1 \quad (10)$$

The parameters used in the rate matching of the present invention when a turbo coding is carried out is as follows.

$$\Delta N = \lfloor \Delta N_{i,*}^{TTI}/2 \rfloor \text{ [for, a first parity bitstream (Y)]} \quad (11)$$

$$\Delta N = \lceil \Delta N_{i,*}^{TTI}/2 \rceil \text{ [for, a second parity bitstream (Z)]} \quad (12)$$

$$N = N_{i,l}^{TTI}/3 \quad (13)$$

$$Nup = \frac{1}{3} \max_{l \in TFS(i)} N_{i,l}^{TTI} \quad (14)$$

$$e_{ini} = 1 \text{ to } \frac{a}{3} \max_{l \in TFS(i)} N_{i,l}^{TTI} \quad (15)$$

A value 'a' is used in the equation (15), because different values of 'a' can be used for the first and second parity sequences for turbo coding which is different from convolution coding. In this instance, in the rate matching following respective channel coding, a procedure for calculating $\Delta N_{i,*}^{TTI}$ for determining puncturing (or repetition) bit size (ΔN) is as follows.

First, a temporary parameter for intermediate calculation $N_{i,*}$ is calculated for all transport channels according to the following equation (16).

$$N_{i,*} = (1/F_i) \max_{l \in TFS(i)} N_{i,l}^{TTI} \quad (16)$$

In (16), $F_i$, represents the number of radio frames in the transmission time interval of transport channel i.

Next, the temporary parameter $N_{i,*}$, is used, and the following Z-Function is applied, for calculating a general puncturing (or repetition) bit size ($\Delta N_{i,*}$) which can be considered as a puncturing number over 10 ms radio frame. In the following, Z value represents an intermediate calculation variable for calculating the amount of puncturing or repetition for each transport channel.

$$Z_{o,j} = 0 \quad (17)$$

$$Z_{ij} = \left\lfloor \frac{\sum_{m=1}^{i} RM_m \cdot N_{mj}}{\sum_{m=1}^{I} RM_m \cdot N_{mj}} \cdot N_{data,j} \right\rfloor \quad (18)$$

$$\Delta N_{ij} = Z_{ij} - Z_{i-1,j} - N_{ij} \quad (19)$$

Where, i=1, - - - , I and represents total number of bits that are available for the multiplexed transport channel in a radio frames with transport combination j.

Finally, above $\Delta N_{i,*}$ is applied to the following equation (20), to calculate $\Delta N_{i,*}^{TTI}$ for all transport channels and transport formats.

$$\Delta N_{i,*}^{TTI} = F_i \cdot \Delta N_{i,*} \quad (20)$$

A rate matching algorithm of the present invention using the parameters fixed as the above will be described. Current uniform rate matching may be described as below, where 'N' denotes a channel coded input bitstream size, and $N_i$ is a rate matched output bitstream size.

---

"if puncturing is to be performed, y = −ΔN ; a number of bits to be punctured e = $e_{ini}$ ; initial error between current and desired puncturing ratio.

-continued

```
m = 1        ; index of current bit
do while m ≤ N
    e = e − a*y; update error
        if e ≤ 0 then; check if bit number m should be punctured
            puncture bit m from set S_O
        e = e + a*N_up; update error
    end if
    m = m + 1    ; index of next bit
end do
else
    y = ΔN        ; a number of bits to be repeated
    e = e_ini     ; initial error between current and desired repeating ratio
    m = 1         ; index of current bit
    do while m ≤ N
        e = e − a*y; update error
        do while e ≤ 0; check if bit number m should be repeated
            repeat bit m from set S_O
            e = e + a*N_up; update error
        end do
        m = m + 1; index of next bit
    end do
end if"
```

In the rate matching of convolution code of the present invention, a parameter "a=2" is used fixedly in determining positions of code bits to be punctured (or repeated) and in the rate matching of turbo code, different values of 'a' may be used for the first parity sequence and the second parity sequence. The initial error offset value $e_{ini}$ of the parameter 'e' for determining the puncturing pattern (or repetition pattern) is calculated in the parameter determining procedure.

An example of rate matching of the present invention will be described with reference to the attached drawings, where it is assumed that a TFS in a TTI has 5 bits, 10 bits, 15 bits, and 20 bits. FIG. 6 illustrates a puncturing pattern when a TTI bit size is 20 in accordance with a first preferred embodiment of the present invention, when the $e_{ini}=1$ regardless of the TTI bit size. In this instance, since an input bitstream size N for the rate matching is equal to the TTI bit size, i.e., N=20, and, when it is assumed that $\Delta N_{i,*}^{TTI}=4$ from a result of calculation on $\Delta N_{i,*}^{TTI}$ for all transport channels and transport formats, an update parameter $N_{up}$ calculated by the max operation of equation (6) is 20.

With regard to puncturing of a first bit (when m=1) among total 20 bits, since y=4, $e_{ini}=1$, and the update error value calculated according to "e=e−2*y" is −7, which satisfies the condition of "e≦0", first puncturing occurs at the first bit. After the puncturing at the first bit, 'e' is updated to e=33 according to "e=e+2*$N_{up}$", and a loop is continued for determining a next bit position to be punctured.

With regard to puncturing of the second bit (when m=2), since y=4, and the update error value calculated according to "e=e−2*y" from e=33 updated in the prior step is 25, which does not satisfy the condition of "e≦0", no puncturing occurs for the second bit. With regard to puncturing of successive third, fourth, and fifth bits (when m=3, 4, 5), since y=4, a decrement (−8) is subtracted repeatedly from the updated e=25, and the update error value calculated according to "e=e−2*y" does not satisfy the condition of "e≦0", no puncturing is occurred at the third, fourth and fifth bits.

With regard to puncturing of a sixth bit (when m=6), since y=4, and the updated error value calculated according to "e=e−2*y" from the e=1 updated in the prior step is −7, which satisfies "e≦0", a second puncturing occurs at the sixth bit. Again, in this instance, the 'e' is updated to e=33 according to "e=e+2*$N_{up}$" after the sixth bit puncturing, and the loop is continued for determining a bit position to be punctured at the next time. A first puncturing occurs at the first bit, and the puncturing occurs thereafter at every fifth bit as a puncturing interval.

FIG. 7 illustrates a puncturing pattern when a TTI bit size is 5 in accordance with an preferred embodiment of the present invention, when the $e_{ini}=1$ regardless of the TTI bit size. In this instance, since an input bitstream size N for the rate matching is equal to the TTI bit size, i.e., N=5, and, when it is assumed that $\Delta N_{i,*}^{TTI}=4$ from a result of calculation on $\Delta N_{i,*}^{TTI}$ for all transport channels and transport formats, an update parameter $N_{up}$ calculated by the max operation of equation (6) is 20.

With regard to puncturing of a first bit (when m=1) among total 5 bits, since y=4, e=1, and the update error value calculated according to "e=e−2*y" is −7, which satisfies the condition of "e≦0", first puncturing occurs at the first bit. After the puncturing at the first bit, 'e' is updated to e=33 according to "e=e+2*$N_{up}$", and a loop is continued for determining a bit position to be punctured at the next time.

With regard to puncturing of the second bit (when m=2), since y=4, and the update error value calculated according to "e=e−2*y" from e=33 updated in the prior step is 25, which does not satisfy the condition of "e≦0", no puncturing occurs at the second bit. With regard to puncturing of successive third, fourth, and fifth bits (when m=3, 4, 5), since y=4, a decrement (−8) is subtracted repeatedly from the updated e=25, and the update error value calculated according to "e=e−2*y" can not satisfy the condition of "e≦0", no puncturing occurs at the third, fourth and fifth bits.

As illustrated from the examples of FIGS. 6 and 7, even if the TTI bit size changes in the rate matching of the present invention, the puncturing occurs at fixed positions. Since the puncturing (or repetition) does not occur at bits concentrated on a portion when the TTI bit size is changed, a uniform puncturing (or a uniform repetition) can be obtained for the channel coded entire bitstreams X, Y, Z.

Different examples of the fixed position rate matching are illustrated in FIGS. 8 and 9, where the parameter $N_{up}$ in accordance with a preferred embodiment of the present invention may be used with the related art $e_{ini}$ of equation (1) and a maximum bit size among bits in the TFS denoting TF transportable during a TTI.

FIG. 8 illustrates a puncturing pattern when a TTI bit size is 20 in accordance with another preferred embodiment of the present invention. In this instance, an input bitstream size N for the rate matching is equal to the TTI bit size, i.e., N=20, and it is assumed that $\Delta N_{i,*}^{TTI}=4$ from a result of calculation on $\Delta N_{i,*}^{TTI}$ in accordance with the present invention for all transport channels and transport formats. An update parameter $N_{up}$ calculated by the max operation of equation (6) is 20, and the initial error offset parameter $e_{ini}=20$ according to the max operation of equation (1).

With regard to puncturing of a first bit (when m=1) among total 20 bits, since y=4, $e_{ini}=20$, and the update error value calculated according to "e=e−2*y" is 12, which does not satisfy the condition of "e≦0", no puncturing occurs at the first bit. With regard to puncturing of a second bit (when m=2), since the update error value calculated according to "e=e−2*y" from e=12 updated in the prior step is 4, which does not satisfy the condition of "e≦0", no puncturing occurs for the second bit. With regard to puncturing of a third bit (when m=3), since y=4, and the update error value calculated according to "e=e−2*y" from e=4 updated in the prior step is −4, which satisfies the condition of "e≦0", a first puncturing occurs at the third bit.

After the puncturing of the third bit, the error value is updated as e=36 according to "e=e+2*$N_{up}$", and a loop is continued for determining a next bit position to be punctured. With regard to puncturing of a fourth bit (when m=4), since y=4, and the update error value calculated according to "e=e−2*y" from e=36 updated in the prior step is 28, that can not satisfy the condition of "e≦0", no puncturing occurs at the fourth bit.

With regard to puncturing of successive fifth, sixth, and seventh bits (when m=5, 6, 7), since y=4, a decrement (−8) is subtracted repeatedly from the e=28 updated in the prior step, and the update error value calculated according to "e=e−2*y" can not satisfy the condition of "e≦0", no puncturing occurs at the fifth, sixth, and seventh bits.

With regard to puncturing of an eighth bit (when m=8), since y=4, and the update error value calculated according to "e=e−2*y" from e=4 updated in the prior step is −4, which satisfies the condition of "e≦0", a second puncturing occurs at the eighth bit. Again, after the puncturing of the eighth bit, the error value is updated as e=36 according to "e=e+2*$N_{up}$", and a loop is continued for determining a next bit position to be punctured. In conclusion, the first puncturing is occurred at the third bit, and a puncturing is occurred at every 5$^{th}$ bit as a puncturing interval, as shown in FIG. 8.

FIG. 9 illustrates a puncturing pattern when a TTI bit size is 5 in accordance with another preferred embodiment of the present invention incorporating the related art initial error offset value $e_{ini}$ of equation (1) into the preferred embodiment. In this instance, since an input bitstream size N for the rate matching is equal to the TTI bit size, i.e., N=5, and it is assumed that $\Delta N_{i,*}^{TTI}$=4 from a result of calculation on $\Delta N^{i,TTI}$ in accordance with the preferred embodiment of equation (6) for all transport channels and transport formats. And, an update parameter $N_{up}$ calculated by the max operation is 20, and the initial error offset parameter $e_{ini}$ is determined to be $e_{ini}$=20 by the max operation.

With regard to puncturing of a first bit (when m=1) among total of 5 bits, since y=4, e=20, and the update error value calculated according to "e=e−2*y" is 12, which does not satisfy the condition of "e≦0", no puncturing occurs at the first bit. With regard to puncturing of the second bit (when m=2), since y=4, and the update error value calculated according to "e=e−2*y" from e=12 updated in the prior step is 4, which does not satisfy the condition of "e≦0", no puncturing occurs at the second bit. With regard to puncturing of the third bit (when m=3), since y=4 and the update error value calculated according to "e=e−2*y" from e=4 updated in the prior step is −4, which satisfies the condition of "e≦0", a first puncturing occurs at the third bit.

After the puncturing of the third bit, the error offset value 'e' is updated to e=36 according to "e=e+2*$N_{up}$", and a loop is continued for determining a next bit position to be punctured. With regard to puncturing of successive fourth, and fifth bits (when m=4, 5), since y=4, a decrement (−8) is subtracted repeatedly from the e=36 updated in the prior step, and the update error value calculated according to "e=e−2*y" can not satisfy the condition of "e≦0", no puncturing occurs at the fourth and fifth bits, eventually.

As illustrated from the examples of FIGS. 8 and 9, in the fixed position rate matching of the present invention, even if the initial error offset value $e_{ini}$ determined according to the max operation in the related art is used, because the update parameter Nup calculated by equation (6) is used, puncturing is occurred at fixed bit positions regardless of a length change of bitstream transportable during one TTI according to a change of a TF. Since the puncturing (or repetition) does not occur at bits concentrated on a portion when the TTI bit size changes uniform puncturing (or a uniform repetition) can be obtained for the entire channel coded bitstreams X, Y, Z, and a fixed puncturing (or repetition) pattern can be obtained regardless of TF change.

As has been described, by using a value suggested in the present invention as the initial error offset value $e_{ini}$ of the rate matching algorithm, the method for matching a rate of the present invention can avoid a case when all puncturing is occurred in an output bitstream 'Z' obtained by "$711_8$=$111001001_2$" polynomial among the three bitstreams branched off from an 1/3 convolutional coded output bitstream at the channel encoder.

Further because the puncturing (or repetition) occurs at uniform and fixed positions for entire convolutional coded bitstream X, Y, Z regardless of a size change of bitstreams transportable during one TTI according to a TF change in a fixed position rate matching, the method for matching a rate, not only improves overall decoding performance, but also supports a blind rate detection in which a reception bit rate is effectively determined.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of performing rate matching in a communication system, comprising:
    setting an initial offset value of a rate matching algorithm to '1'; and
    performing one of puncturing and repetition according to the rate matching algorithm using the initial offset value, wherein the initial offset value sets an initial puncturing or repetition position for input bits.

2. The method of claim 1, further comprising
    updating the initial error offset value to form and updated offset value;
    performing one of puncturing and repetition according to the rate matching algorithm using the updated offset value.

3. The method of claim 1, wherein one of puncturing and repetition is performed on a prescribed bit of the input bits when a difference between an offset value based on the initial offset value and the product of 2 multiplied by a number of bits to be punctured or repeated is less than or equal to 0.

4. The method of claim 3, wherein each bit of the bit stream is sequentially considered for puncturing or repeating, and for each bit of the input bits, the offset value is recalculated according to a sum of a previous offset value plus the product of 2 multiplied by the number of bits in the bit stream.

5. A method of performing rate matching in an uplink of a communication system, comprising:
    setting an initial offset value of a rate matching algorithm for a radio frame to a prescribed value, the prescribed value being equal to a modulus of (a) a sum of '1' plus a product of a shifting amount multiplied by a number of bits to be punctured, modulo (b) a number of bits in the radio frame; and performing one of puncturing and repetition according to the rate matching algorithm using the initial offset value.

6. The method of claim 5, wherein the initial offset value is '1' for a first radio frame.

7. The method of claim 5, wherein a constant value is multiplied by each of the shifting amount and the number of bits in the radio frame prior to determining the initial offset value.

8. The method of claim 7, wherein the constant is '2'.

9. A device to match a rate in a mobile communication system, comprising:
   a channel encoder, configured to output at least one bitstream; and
   at least one rate matching block coupled to receive the at least one bit stream and adjust a transport code rate by one of puncturing and repetition according to a rate matching algorithm using an initial offset value of '1', wherein the initial offset value sets an initial puncturing or repetition position.

10. A method for matching a rate in a mobile communication system based on puncturing or repetition, the method comprising:
    setting an initial offset value for input bits to be punctured or repeated;
    updating the initial offset value by adding an update parameter, the update parameter being a maximum bit size among transport format transportable during one transport time interval in a transport format set; and
    performing one of puncturing and repetition when the updated initial offset value is no greater than a prescribed value.

11. The method of claim 10, wherein the communication system uses at least one of convolutional coding and fixed position coding.

12. The method of claim 10, wherein the initial offset value is determined based on a size of the input bits to be punctured or repeated.

13. The method of claim 10, wherein the initial offset value is '1'.

14. A method of rate matching comprising:
    (a) convolutional encoding of input bits;
    (b) rate matching the coded bits, wherein the rate matching step comprises:
        (i) setting an initial value of a first parameter (e) for a rate matching algorithm, the initial value of the first parameter is used in the rate matching algorithm to decide a first bit position within the coded bits to be punctured or repeated and the initial value is a constant value equal to one;
        (ii) performing puncturing or repetition of a coded bit based on the initial value.

15. The method of claim 14, wherein the coded bit is punctured or repeated in step (ii) if a resultant value of the first parameter based on the rate matching algorithm is less than or equal to zero.

16. The method of claim 15, wherein the resultant value of the first parameter (e)=e−a*y, where a is equal to two and y is a value corresponding to a number of bits to be punctured or repeated.

17. The method of claim 16, wherein step (b) further comprises (iii) determining a next bit position to be punctured or repeated based on the rate matching algorithm using the resultant value of the first parameter.

18. The method of claim 14, wherein the rate matching is a downlink rate matching.

19. The method of claim 14, further comprising interleaving a result of the convolutional step encoding prior to the rate matching step and wherein the rate matching is an uplink rate matching.

20. The method of claim 14, wherein the convolutional coding rate is 1/3.

21. The method of claim 14, wherein the initial value of the first parameter is set based on the following:

$$[(a*S(k))*|\Delta N|+1] \bmod a*N,$$

where a=2, S(k) is a first prescribed value, $\Delta N$ is a number of bits to be punctured or repeated and N is a second prescribed value.

22. A method of rate matching comprising:
a) convolutional encoding of input bits;
b) rate matching by puncturing or repetition of a prescribed number of coded bits, wherein the rate matching step comprises:
    i) setting a value of a parameter (e) to an initial value of one;
    ii) updating a current value of the parameter (e) using a previous value of the parameter (e);
    iii) performing puncturing or repetition of a coded bit at a corresponding bit index if the current value equals a predetermined value and updating the current value of the parameter (e), or otherwise, not performing puncturing or repetition of the coded bit; and
    iv) repeating steps ii) and iii).

23. The method of claim 22, wherein after puncturing or repetition of the bit, updating the parameter using the value corresponding to a bit number of a transport format with a maximum number of bits among a transport format set in the transmission time interval before rate matching.

24. The method of claim 22, wherein the parameter (e) is updated based on e+a*Nup, where a=2 and Nup is value corresponding to a maximum number of bits of a transport format of a transport format set in a transmission time interval before rate matching.

25. The method of claim 22, wherein in step (iii), the coded bit at the corresponding bit index is punctured or repeated in step (2) if the current value of the parameter is less than or equal to the predetermined value of zero.

26. The method of claim 22, wherein in step (ii), the current value is updated as follows: e−a*y, where a is equal to two and y is a value corresponding to a number of bits to be punctured or repeated.

27. The method of claim 22, wherein the rate matching is a downlink rate matching.

28. The method of claim 22, further comprising interleaving a result of the convolutional encoding step prior to the rate matching step, and wherein the rate matching is an uplink rate matching.

29. The method of claim 22, wherein the rate matching is a fixed position rate matching.

30. The method of claim 22, wherein the convolutional coding rate is 1/3.

31. A method of rate matching comprising:
    outputting a plurality of coded bits by an encoder;
    setting an initial value of a first parameter for a rate matching algorithm;
    performing puncturing or repetition of a coded bit based on the first parameter using the rate matching algorithm; and updating the first parameter based on a second parameter, wherein a value of the second parameter is a same value for every transport format of a transport format set in a transmission time interval.

32. The method of claim 31, wherein the encoder is a convolutional encoder.

33. The method of claim 32, wherein the coding rate of the convolutional encoder is 1/3.

34. The method of claim 31, wherein the initial value of the first parameter is a constant value.

35. The method of claim 34, wherein the constant value is one.

36. The method of claim 31, wherein the first parameter is updated based on the second parameter to determine a next coded bit at a corresponding bit position is to be punctured or repeated using the rate matching algorithm.

37. The method of claim 31, wherein the same constant value corresponds to a bit number of a transport format with a maximum number of bits among a transport format set in a transmission time interval before rate matching.

38. The method of claim 31, wherein the coded bit at the corresponding bit index is punctured or repeated if a value of the first parameter is less than or equal to zero.

39. The method of claim 31, wherein the rate matching is a downlink rate matching.

40. The method of claim 31, wherein the rate matching is a fixed position rate matching.

* * * * *